(12) United States Patent
Wilkins et al.

(10) Patent No.: US 9,038,809 B2
(45) Date of Patent: May 26, 2015

(54) SORTATION CONVEYOR WITH PIEZOELECTRIC ACTUATION

(71) Applicant: Intelligrated Headquarters, LLC, Mason, OH (US)

(72) Inventors: John Wilkins, Erlanger, KY (US); Justin Zimmer, Dayton, OH (US)

(73) Assignee: Intelligrated Headquarters, LLC, Mason, OH (US)

( * ) Notice: Subject to any disclaimer, the term of this patent is extended or adjusted under 35 U.S.C. 154(b) by 0 days.

(21) Appl. No.: 14/295,624

(22) Filed: Jun. 4, 2014

(65) Prior Publication Data

US 2014/0360838 A1    Dec. 11, 2014

Related U.S. Application Data

(60) Provisional application No. 61/831,309, filed on Jun. 5, 2013.

(51) Int. Cl.
*B65G 47/46* (2006.01)
*B65G 47/84* (2006.01)

(52) U.S. Cl.
CPC .............. *B65G 47/844* (2013.01); *B65G 47/46* (2013.01); *B65G 2207/36* (2013.01)

(58) Field of Classification Search
CPC ... B65G 47/844; B65G 2207/36; B65G 47/46
USPC .................................................... 198/370.02
See application file for complete search history.

(56) References Cited

U.S. PATENT DOCUMENTS

| | | | |
|---|---|---|---|
| 4,088,224 A | 5/1978 | Kittredge | |
| 5,217,105 A | 6/1993 | Sapp et al. | |
| 5,333,715 A * | 8/1994 | Sapp | 198/370.02 |
| 6,478,142 B2 | 11/2002 | Cotter et al. | |
| 6,615,972 B2 | 9/2003 | Veit et al. | |
| 6,889,822 B1 | 5/2005 | Wagner et al. | |
| 6,951,274 B2 | 10/2005 | Zeitler et al. | |
| 7,304,260 B2 * | 12/2007 | Boller et al. | 209/584 |
| 7,441,646 B2 | 10/2008 | Heit et al. | |
| 7,516,835 B2 | 4/2009 | Neiser et al. | |
| 7,604,110 B2 | 10/2009 | Deur | |
| 7,841,461 B2 | 11/2010 | Nguyen et al. | |
| 7,857,116 B2 | 12/2010 | Heit et al. | |
| 8,408,384 B2 | 4/2013 | Rogers | |
| 8,604,670 B2 | 12/2013 | Mahameed et al. | |
| 8,727,096 B2 * | 5/2014 | Schroader | 198/370.01 |
| 8,754,571 B2 | 6/2014 | Pryadkin | |

(Continued)

OTHER PUBLICATIONS

International Search Report and Written Opinion dated Sep. 24, 2014 for Application No. PCT/US2014/040831.

(Continued)

*Primary Examiner* — Mark A Deuble
(74) *Attorney, Agent, or Firm* — Frost Brown Todd LLC

(57) ABSTRACT

A sortation conveyor for transporting and diverting a plurality of articles includes a first conveying path and a second conveying path angularly positioned relative to the first conveying path. A plurality of pusher elements may be selectively diverted laterally across the first conveying path to divert articles to the second conveying path. A piezoelectric actuated switch assembly positioned adjacent to the second conveying path selectively engages the pusher elements to divert the selected article to the second conveying path.

17 Claims, 12 Drawing Sheets

(56) References Cited

U.S. PATENT DOCUMENTS

| | | |
|---|---|---|
| 8,943,906 B2 | 2/2015 | Ayanji et al. |
| 2002/0084172 A1* | 7/2002 | Toms ............................ 198/445 |
| 2006/0076216 A1 | 4/2006 | Wagner et al. |
| 2006/0249355 A1 | 11/2006 | Costanzo et al. |
| 2007/0289839 A1* | 12/2007 | Zimmer ................... 198/370.02 |
| 2009/0032375 A1* | 2/2009 | Boeger et al. ................. 198/769 |
| 2009/0139834 A1* | 6/2009 | Brayman et al. ......... 198/370.02 |
| 2012/0312663 A1 | 12/2012 | Schmidt et al. |
| 2014/0224622 A1 | 8/2014 | German |

OTHER PUBLICATIONS

International Search Report and Written Opinion dated Sep. 24, 2014 for Application No. PCT/US2014/040843.

US Office Action, Non-Final, dated Jan. 7, 2015 for U.S. Appl. No. 14/295,617.

* cited by examiner

SORTATION CONVEYOR WITH PIEZOELECTRIC ACTUATION

PRIORITY

This application claims priority to U.S. Provisional Patent Application Ser. No. 61/831,309, filed Jun. 5, 2013, entitled "Sortation Conveyor With Piezoelectric Actuation," the entire contents of which are incorporated by reference herein.

BACKGROUND

The present disclosure relates to sortation conveyors, also known as sorters, for use with high volume distribution and fulfillment operations. A sortation conveyor system typically comprises an upper conveying surface moving in a downstream longitudinal direction, defining a first conveying path, which conveyors articles carried thereon. One or more divert conveyors, also known as branch conveyors or spurs, extend transversely at divert locations from either side of the first conveying path. Sortation conveyors can selectively divert articles from the first conveying path to a second conveying path defined by the divert conveyors by employing a plurality of pusher elements. When it is desired to direct an article from the first conveying path and onto the second conveying path, a switch or switch mechanism can be actuated to cause an assigned set of pusher elements to be diverted laterally across the upper conveying surface to engage and push the selected article onto the second conveying path. Described herein are versions of switches for use with a sortation conveyor to selectively divert articles from the sortation conveyor system.

BRIEF DESCRIPTION OF THE DRAWINGS

The accompanying drawings, which are incorporated herein and constitute part of this specification, illustrate exemplary embodiments of the invention, and, together with the general description given above and the detailed description given below, serve to explain the principles of the present invention.

DETAILED DESCRIPTION

Figure 1:
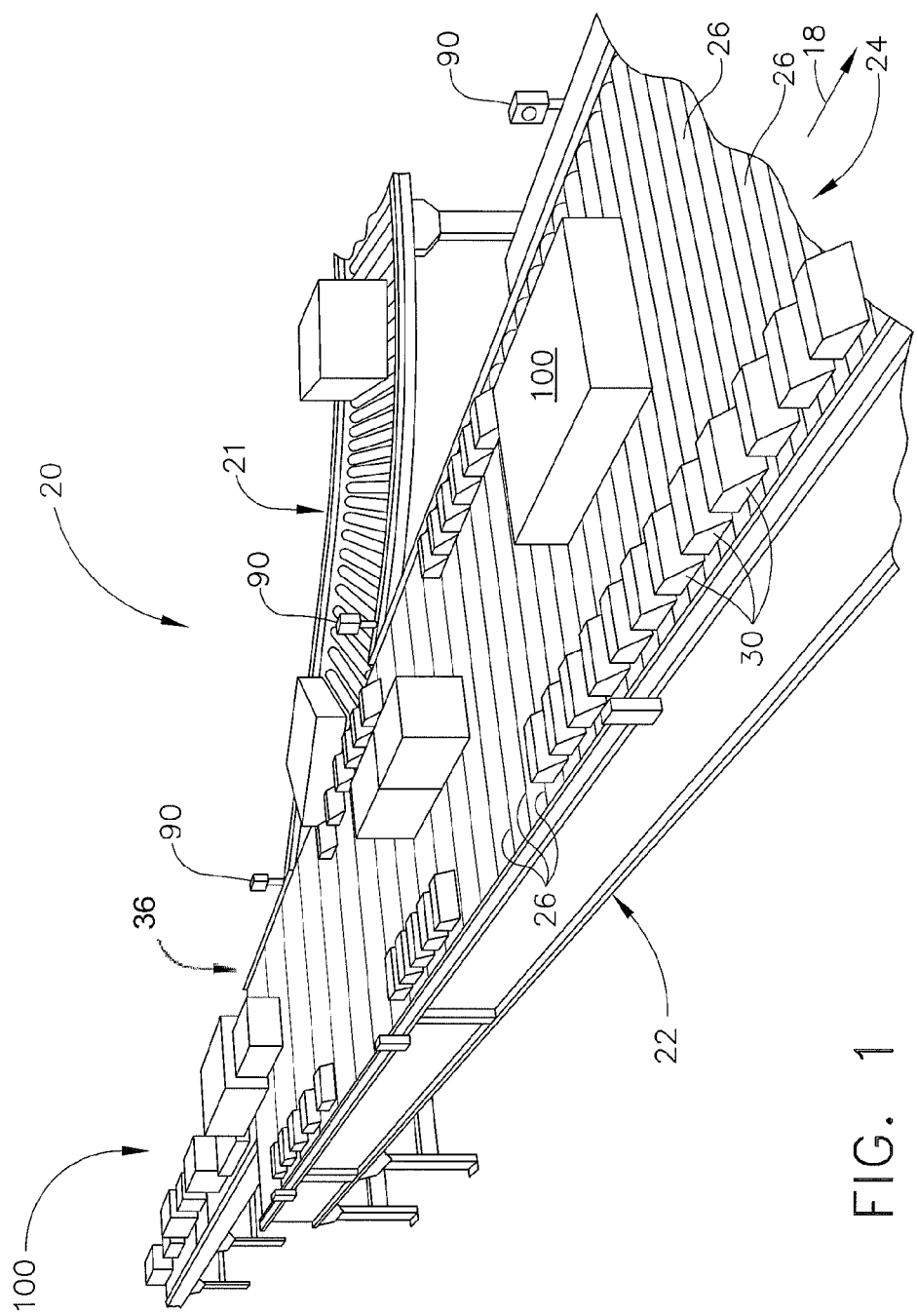
FIG. 1 is an isometric view of a portion of a sortation conveyor.

In the following description, like reference characters designate like or corresponding parts throughout the several views. Also, in the following description, it is to be understood that terms such as front, back, inside, outside, and the like are words of convenience and are not to be construed as limiting terms. Terminology used in this patent is not meant to be limiting insofar as devices described herein, or portions thereof, may be attached or utilized in other orientations.

It should be appreciated that any patent, publication, or other disclosure material, in whole or in part, that is said to be incorporated by reference herein is incorporated herein only to the extent that the incorporated material does not conflict with existing definitions, statements, or other disclosure material set forth in this disclosure. As such, and to the extent necessary, the disclosure as explicitly set forth herein supersedes any conflicting material incorporated herein by reference.

The word "exemplary" is used herein to mean "serving as an example, instance, or illustration." Any implementation described herein as "exemplary" is not necessarily to be construed as preferred or advantageous over other implementations.

A sortation conveyor is configured to sequentially transport and selectively divert a plurality of articles from a first conveying path of the sortation conveyor to a second path of the sortation conveyor which branches relative to the first conveying path. A plurality of pusher elements are selectively moveable laterally across the first conveying path. The sortation conveyor includes a piezoelectric switch positioned adjacent the second conveying path which is configured to selectively engage with at least one pusher element so as to divert selected articles from the first conveying path or home path to the second conveying path.

FIG. 1 shows sortation conveyor 20 transporting a plurality of articles 100. Sortation conveyor 20 includes conveying surface 24 and a divert location 36 from which branch 21 extends. In the embodiment depicted, conveying surface 24 defines a first conveying path and branch 21 defines a second conveying path. Conveying surface 24 comprises laterally extending members 26 which are advanced in the downstream longitudinal direction indicated by arrow 18. In the embodiment shown in FIG. 1, laterally extending members 26 are depicted as tubes or slats, which are generally parallel to each other. Sortation conveyor 20 is configured to selectively divert articles 100 from the first conveying path of conveying surface 24 to the second conveying path of branch 21.

Conveying surface 24 carries a plurality of pusher elements 30 which may be selectively diverted from home path 8 (see FIG. 4) to travel laterally (transverse to the longitudinal direction of travel of conveying surface 24) guided by a divert guide track 10 (see FIG. 4) underlying the upper surface of conveying surface 24. Examples of such pusher elements are described in U.S. Pat. No. 7,441,646, entitled "Sortation System Pusher," issued Oct. 28, 2008, the disclosure of which is incorporated by reference herein in its entirety.

One or more sensors 90 may be positioned along the first conveying path to identify articles 100. For example, sensors 90 can track articles 100 by sensing or scanning barcodes on articles 100. Other sensing configurations will be apparent to one with ordinary skill in the art in view of the teachings herein. FIG. 1 shows first conveying surface 24 and sensors 90 supported by frame 22. If a particular article 100 is selected to continue travelling along the first conveyor path, pusher elements 30 continue to travel along home path 8 along a side of conveying surface 24 along the first conveying path. If a particular article 100 is selected to be diverted at divert location 36 to the second conveying path, selected pusher elements 30 are diverted to travel laterally across conveying surface 24 to engage and divert the selected article 100 onto branch 21. FIG. 1 shows sortation conveyor 20 having one divert location 36, but it should be noted that sortation conveyor 20 can include any suitable number of divert locations 36, extending to either side of sortation conveyor 20.

Figure 2:
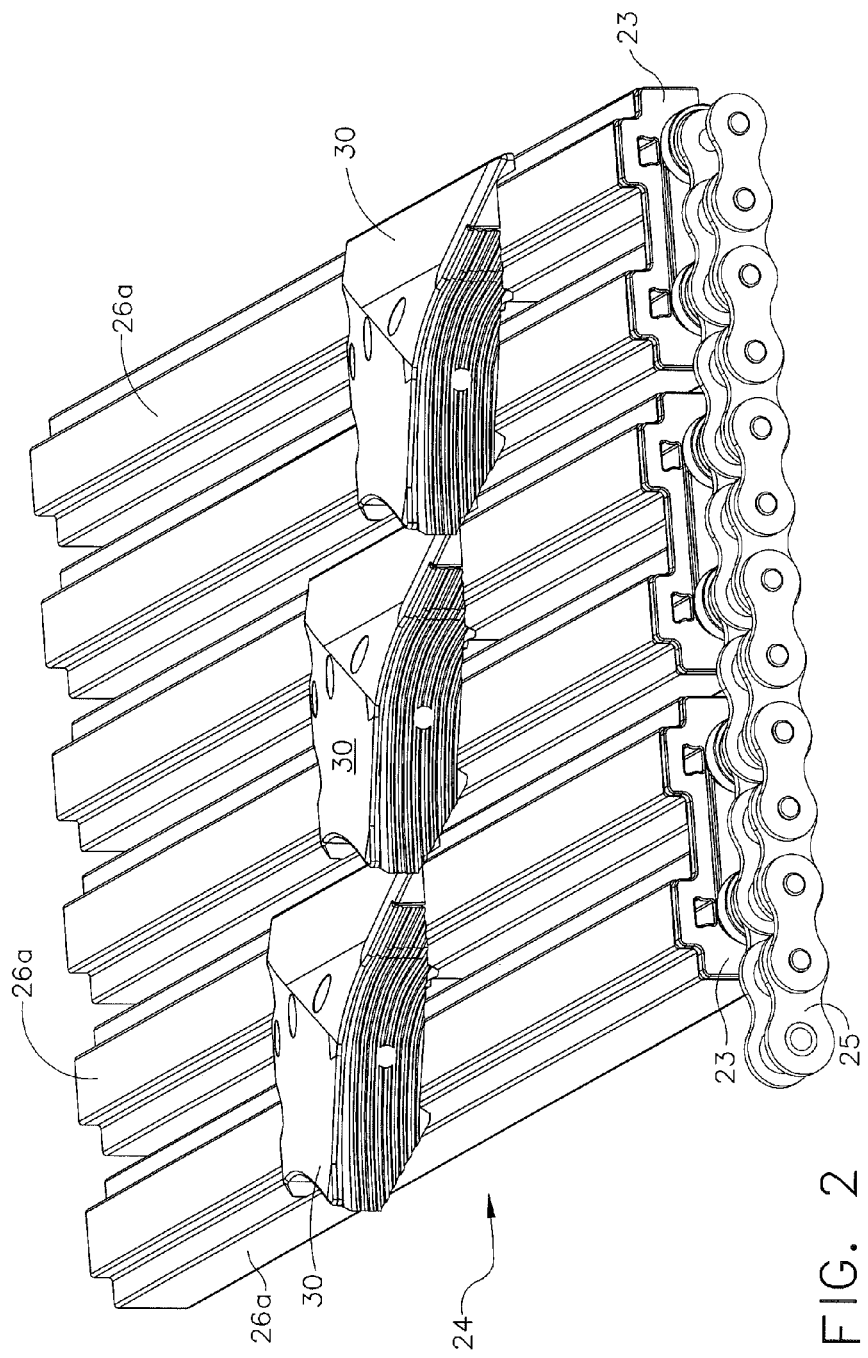
FIG. 2 is a fragmentary perspective view of a conveying surface of the sortation conveyor showing a plurality of pusher elements aligned in a diverting arrangement.
Figure 3:
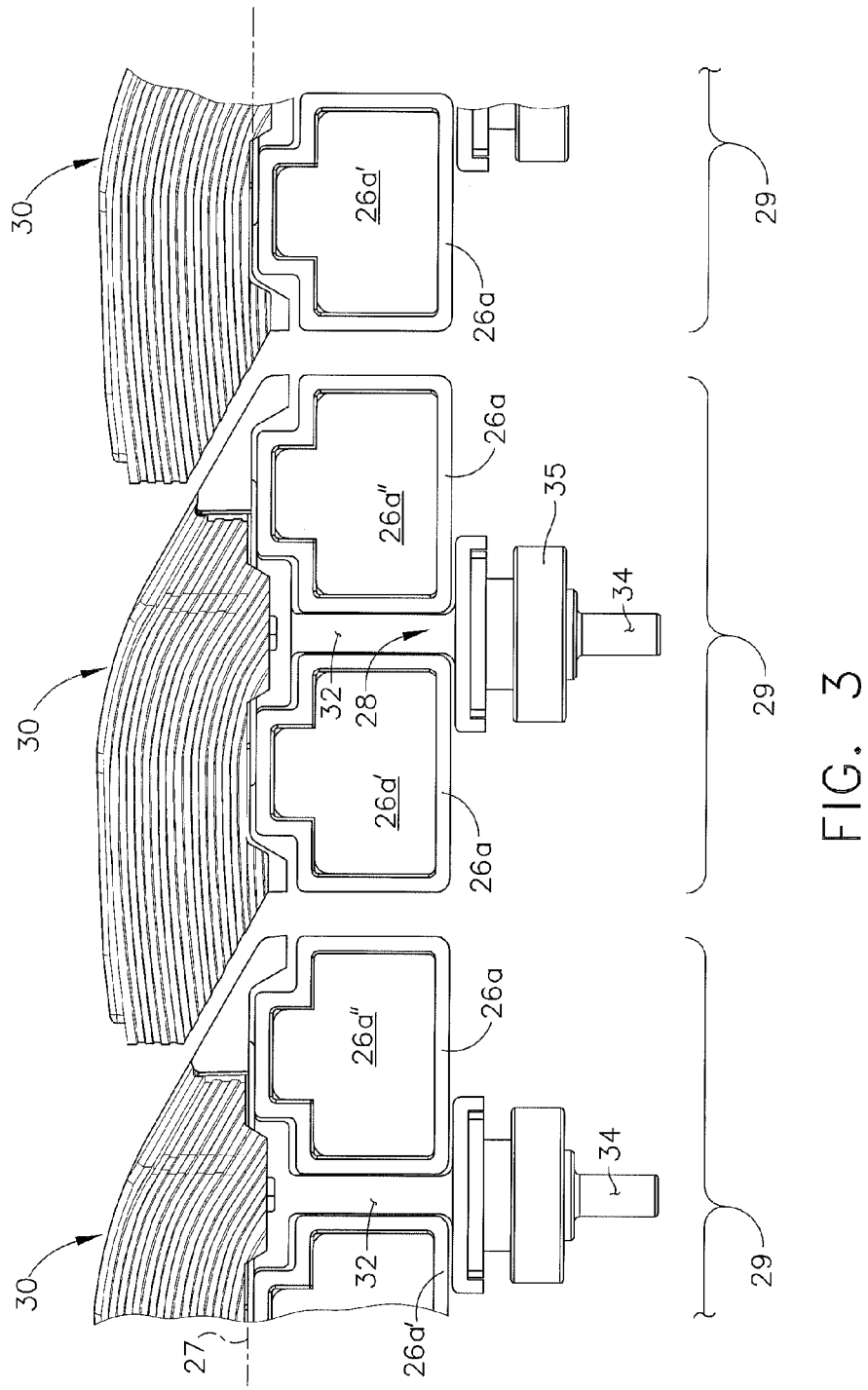
FIG. 3 is an enlarged fragmentary side view of the plurality of pusher elements of FIG. 2.

FIGS. 2-3 show a conveying surface comprised of slats 26a instead of tubes. Slats 26a, which define first conveying surface 24 and the first conveying path, are advanced in the downstream longitudinal direction by chain 25, which is driven by a motor (not shown). Pusher elements 30 are positioned on slats 26a, each carried by flights 29 comprising leading slat 26a' and trailing slat 26a''. Slats 26a', 26a'' are coupled together by end caps 23 (see FIG. 2) held in a spaced apart relationship to define pusher guide path 28 therebetween, as shown in FIG. 3. Each pusher element 30 comprises pusher base 32 complementarily shaped to the gap formed between slats 26a', 26b, so as to travel laterally within guide path 28. Extending below pusher base 32 are guide member 34 and bearing 35. FIG. 3 shows slats 26a', 26a'' having substantially similar shapes. Further examples of slats 26a and pusher elements 30 are disclosed in U.S. Pat. No. 7,857,116, entitled "Sortation System," issued Dec. 28, 2010, and U.S. Pat. No. 5,217,105, entitled "Sorting Conveyor System and Divert Switch and Crossover Switch for Said System," issued May 8, 1993, the disclosures of which are incorporated by reference herein in their entirety.

Figure 4:
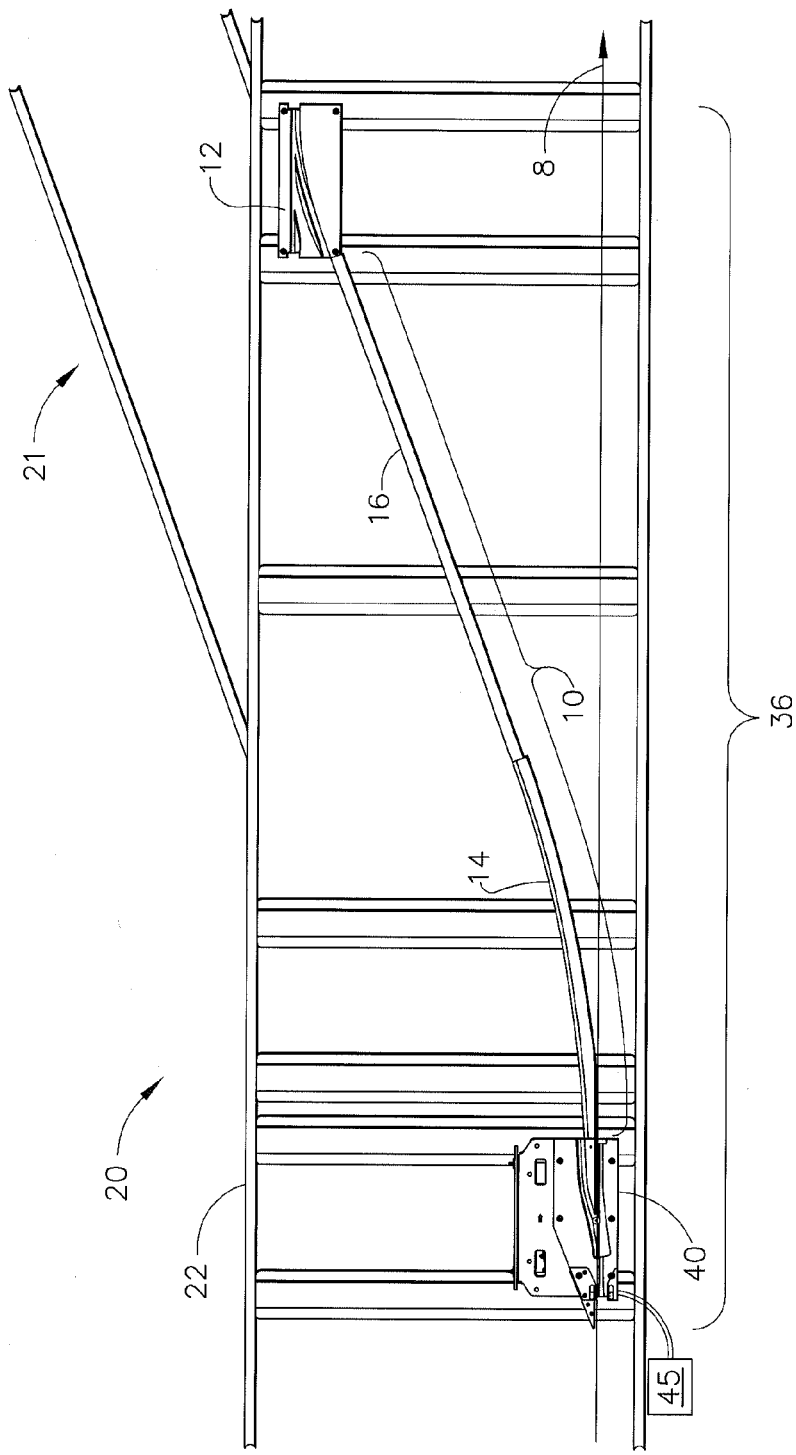
FIG. 4 is a top plan view of a portion of the sortation conveyor of FIG. 1 with the conveying surface and pusher elements omitted to show the switching assembly and downstream divert guide track.

FIG. 4 is a top plan view of a portion sortation conveyor 20, showing divert location 36 of sortation conveyor 20, with slats and pusher elements omitted so as to show switch assembly 40, divert guide track 10, and return 12. As used herein, divert location refers to a section of a conveyor whereat an article is directed from the conveyor and discharged transversely onto a divert conveyor. Branch 21 is disposed at divert location 36 to receive articles 100 which are selectively diverted thereon by diverting pusher elements 30 at divert location 36. Branch 21 may be any configuration suitable to receive articles 100, such as a powered or non-powered conveyor, a chute, a hopper, a bag or a bin. Divert guide track 10 may be of any suitable configuration, which in the embodiment depicted includes arcuate section 14 configured to distribute the force necessary to move articles 100 toward the second conveying path over a longitudinal and lateral distance.

Divert guide track 10 is disposed downstream of associated corresponding switch assembly 40. Pusher elements 30 may be selective diverted by switch assembly 40 to divert guide track 10, which guides pusher element 30 to travel laterally across conveying surface 24. Control system 45 is configured to receive data from sensors 90 to identify articles 100, process such data, determine whether a particular article is to be diverted at a particular divert location, and to actuate switch assembly 40 to divert pusher elements 30. Switch assembly 40 is actuated at an appropriate time to cause transverse motion of a selected one or more pusher elements 30, which then contacts and diverts articles 100.

The associated return 12 is downstream of divert guide track 10 and switch assembly 40. Further examples of diversion components and methods are disclosed in U.S. Pat. No. 7,516,835, entitled "Sortation Conveyor," issued Apr. 14, 2009, the disclosure of which is incorporated by reference herein in its entirety.

Figure 5:
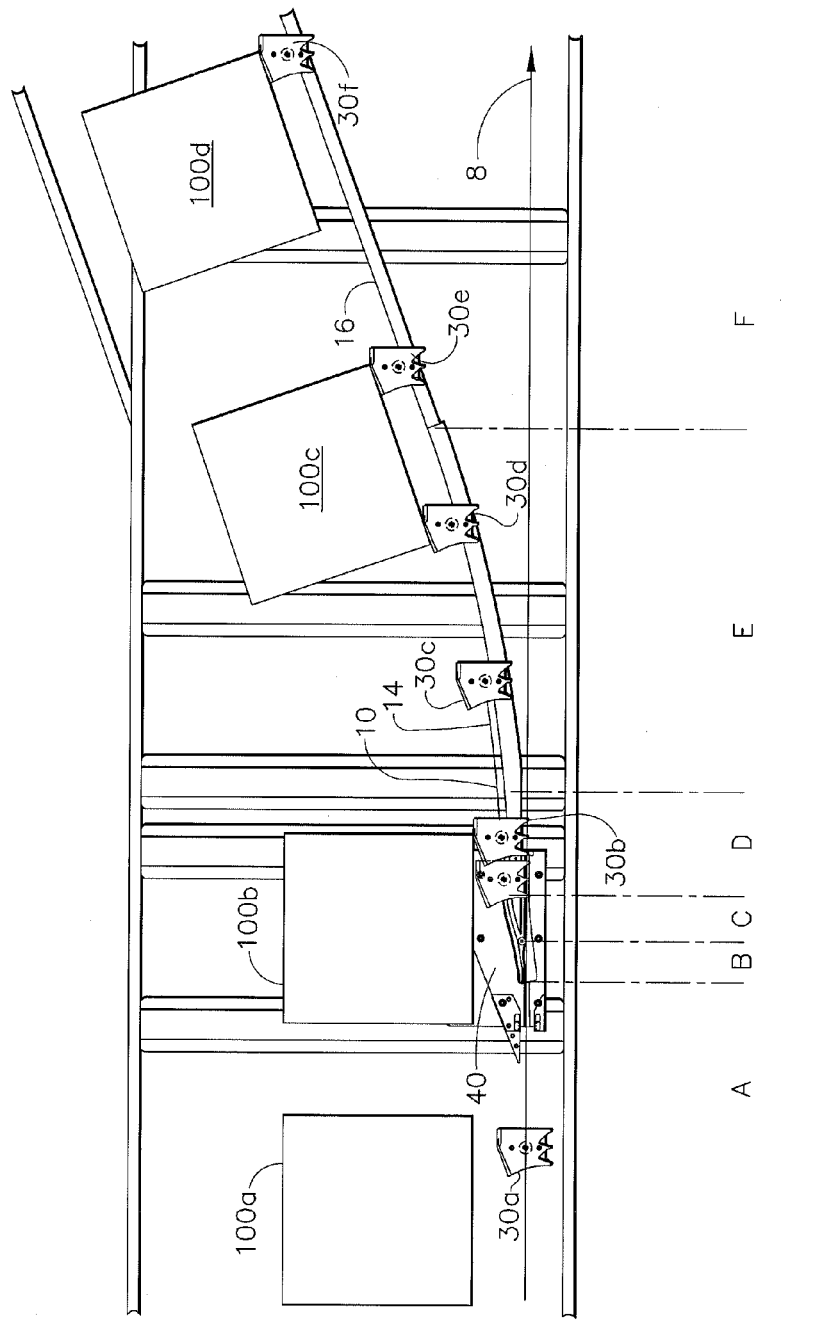
FIG. 5 is an enlarged fragmentary top plan view of the portion of the sortation conveyor of FIG. 1, showing the pusher elements diverting a plurality of articles.

FIG. 5 shows a plurality of pusher elements 30a-f illustrated at various locations along home path 8 and along divert guide track 10. Some pusher elements 30 have been omitted for clarity. Pusher element 30a is illustrated traveling along home path 8 following first conveying path 24. Unless diverted by switch assembly 40, pusher element 30a will continue traveling along home path 8 downstream of switch assembly 40. Pusher element 30b has been diverted and is illustrated at the entrance to divert guide track 10. Pusher elements 30c, 30d are traveling along arcuate section 14 of divert guide track 10. As illustrated, pusher element 30c is travelling at a lower divert angle than pusher element 30d. Pusher elements 30e, 30f are travelling through straight section 16 of divert guide track 10. Accordingly, articles 100b, 100c, 100d are illustrated as being diverted toward branch 21.

Figure 6:
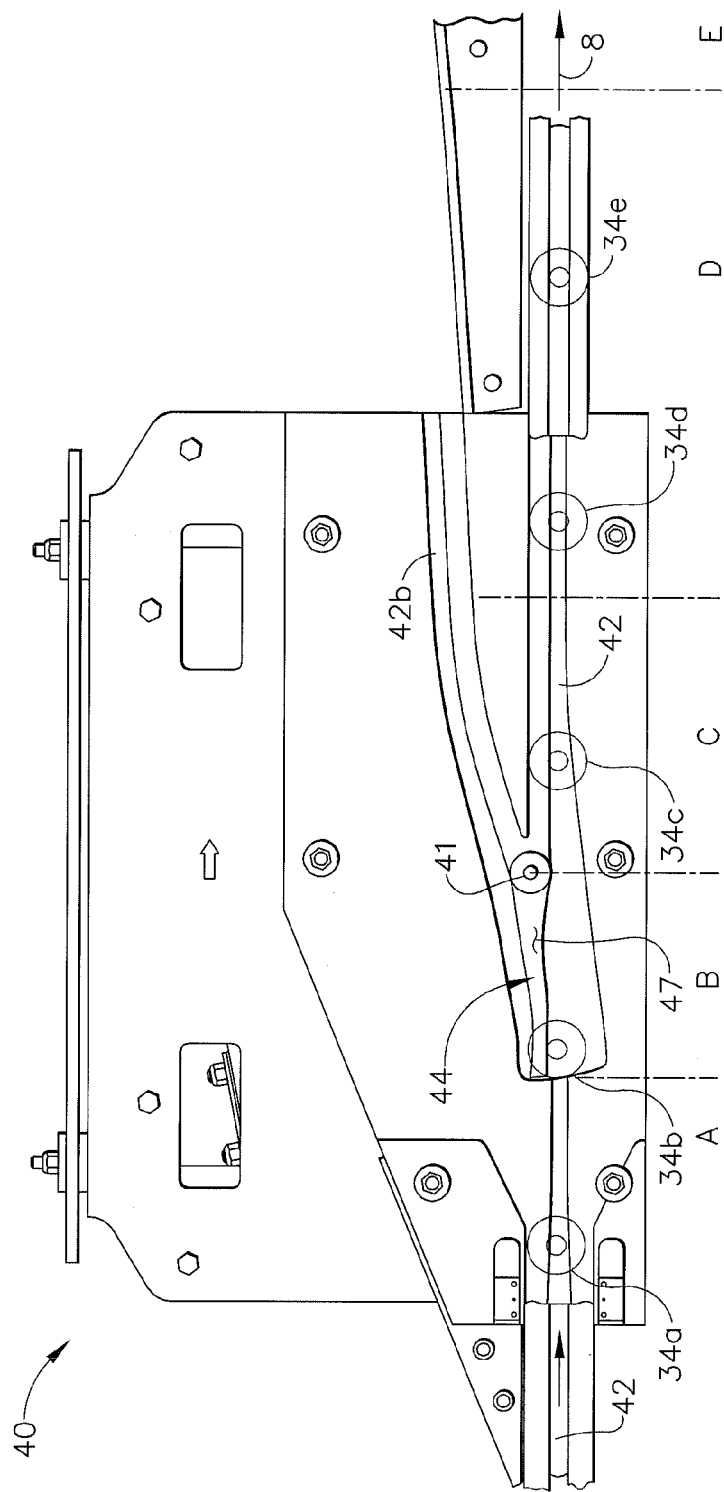
FIG. 6 is an enlarged fragmentary top plan view of the switching assembly of FIG. 4 in a first position.
Figure 7:
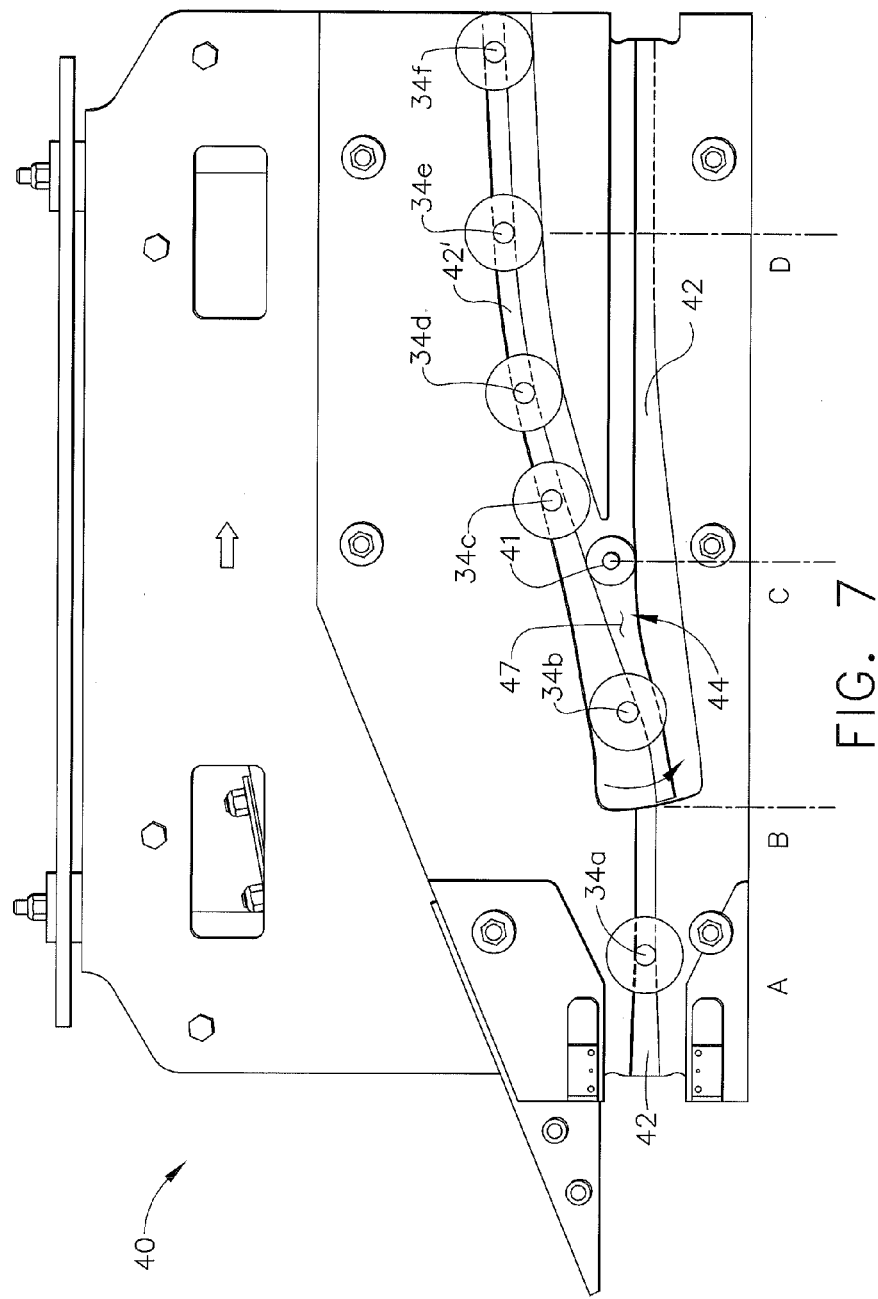
FIG. 7 is an enlarged fragmentary top plan view of the switching assembly of FIG. 4 in a second position.
Figure 8:
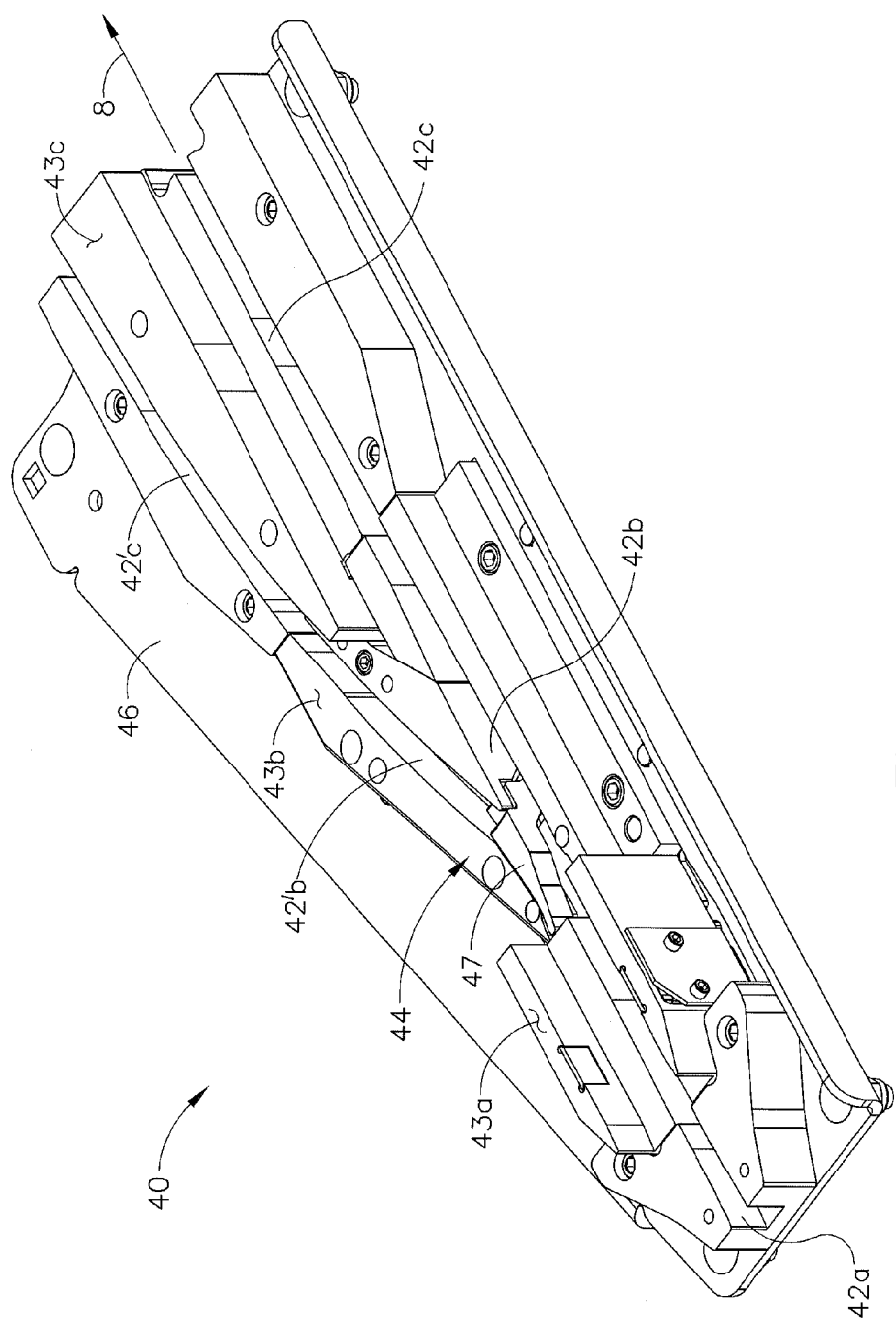
FIG. 8 is an isometric view of the switching assembly of FIG. 4.

Referring to FIGS. 6, 7 and 8, switch assembly 40 defines switch guide track 42, which is depicted as straight through switch guide track 42 and aligned with and defining home path 8 within switch assembly 40. Switch assembly 40 also defines switch divert guide track 42' the path onto which pusher elements 30 may be selectively diverted so as to travel along divert guide track 10. Switch assembly 40 may comprise guide block 43 defining switch guide track 42 and switch divert guide track 42', for guiding and switching guide members 34 and guiding bearings 35. Guide block 43 may be of unitary construction, as shown in FIGS. 6 & 7, or may, as shown in FIG. 8, comprise first guide block 43a, second guide block 43b, and third guide block 43c, all carried by base 46. While three guide blocks 43a, 43b, 43c are shown, any other suitable number of guide blocks 43a, 43b, 43c can be used. In FIG. 8, guide block 43a defines switch guide track 42a, guide block 43b defines switch guide track 42b and guide block 43c defines switch guide track 42c, which collectively define switch guide track 42. Switch assembly 40 is shown in FIG. 6 with switch arm 47 in a first position at which switch arm 47 does not extend into switch guide track 42, which allows guide members 34 to travel straight through along switch guide track 42 and home path 8, as illustrated by the positions of guide members 34a-e, which extend into switch guide track 42. Guide block 43 also defines switch divert guide track 42'. In FIG. 8, guide block 43b defines switch divert guide track 42'b and guide block 43c defines switch divert guide track 42'c. FIG. 7 illustrates switch arm 47 in a second position at which switch arm 47 extends into switch guide track 42, which switches or diverts guide members 34 from switch guide track 42/home path 8, onto switch divert guide track 42'. As is known, pusher elements 30 are diverted onto switch divert guide track 42'b by switching on guide members 34 then transitioning the contact to bearings 35 which are configured to handle the force exerted on pusher elements 30 when diverting article 100. When in switch divert guide track 42'c, bearings 35 are in full contact therewith and guide member 34 have no significant loading. The exit of switch divert guide track 42'c is aligned with divert guide track 10 such that bearings 35 transition from the exit of switch divert guide track 42'c into contact with divert guide track 10 smoothly.

Figure 10:
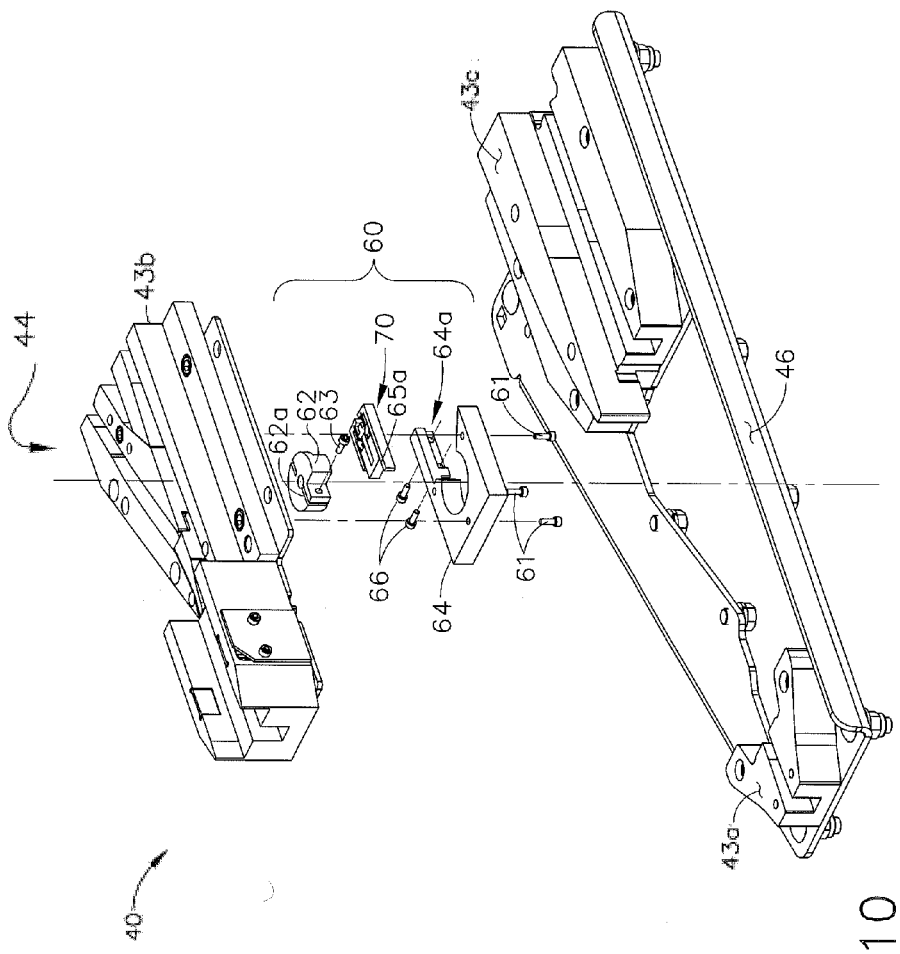
FIG. 10 is an isometric view of the second guide block exploded from the switching assembly, and with an exploded piezoelectric assembly.

Switch assembly 40 of the present example is a piezoelectric switch assembly that includes piezoelectric switch 44. Such a piezoelectric switch assembly 40 may operate at higher speeds than magnetic or pneumatic switching systems to selectively engage with one or more pusher elements 30 to divert the selected article from the first conveying path and onto the branch 21. This may result in increased article throughput, reduced switch actuation time, lower power consumption, increased duty cycle, reduced mechanism part counts, higher conveyor speeds, and reduced assembly and maintenance costs. Piezoelectric switch 44 attaches to an underside of guide block 43b as shown in FIG. 10. The piezoelectric switch 44 further comprises a guide block 43b including a switch guide track 42b to guide the plurality of pusher elements along home path 8 and including a switch divert guide track 42'b configured to divert at least one of the plurality of pusher elements 30 from the home path 8. The piezoelectric switch 44 of the sortation conveyor 20 is configured to selectively divert the at least one of the plurality of pusher elements 30 from the switch guide track 42b portion of the home path 8 and onto the switch divert guide track 42'b.

Figure 9:
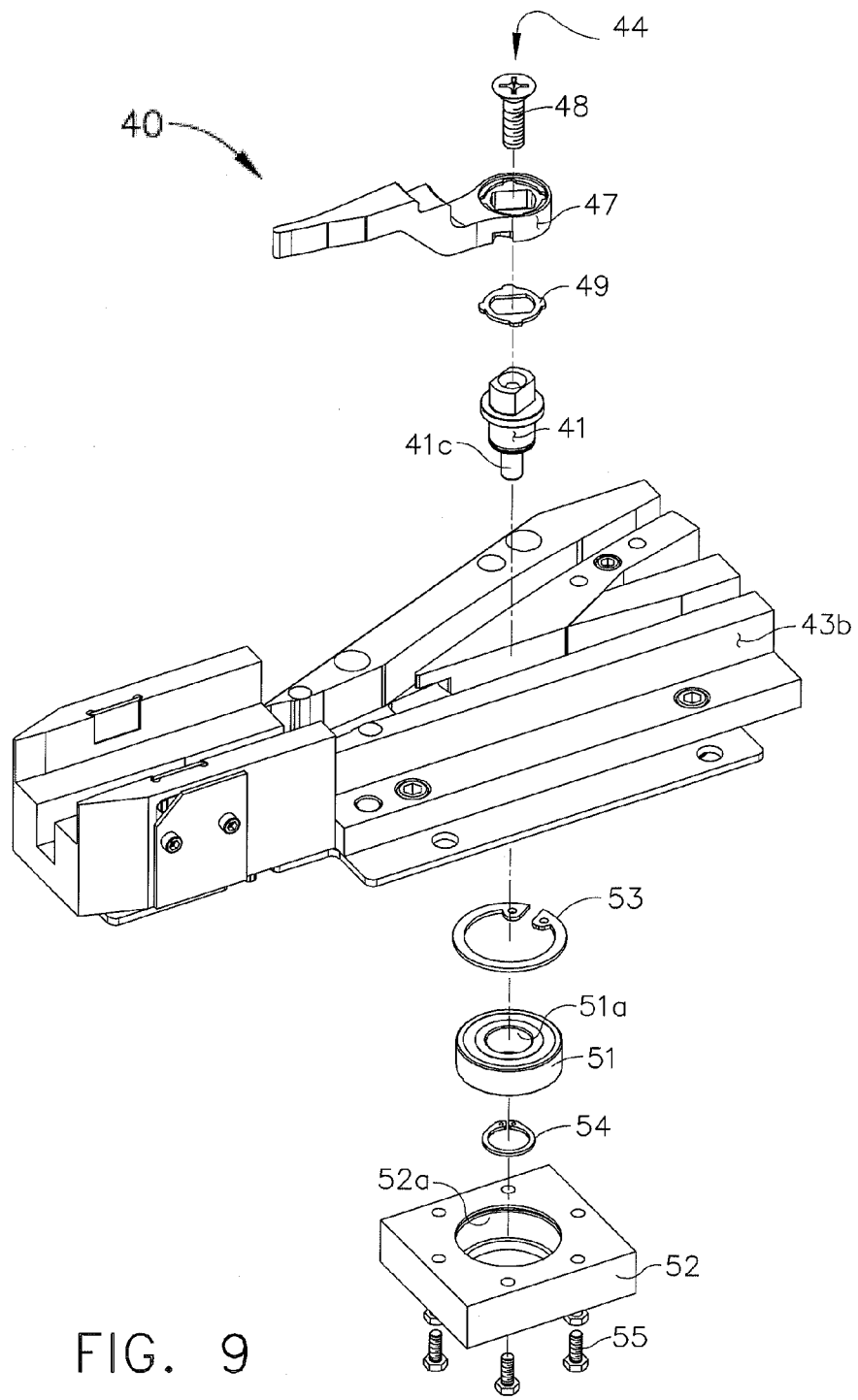
FIG. 9 is an isometric view of a partially exploded second guide block of the switching assembly of FIG. 4.

Turning back to FIG. 9, for the three guide block configuration illustrated, second guide block 43b carries piezoelectric switch 44, with switch arm 47 disposed to be selectively moved between the first and second positions describe above. In the embodiment depicted, piezoelectric switch 44 pivotally mounts through second guide block 43b and extends therebelow. Bearing plate 52 is shown positioned under second guide block 43b and defines locking plate recess 52a. Bearing 51 is secured with locking ring 53 within locking plate recess 52a of bearing plate 52. Bearing plate 52 is secured to second guide block 43b by screws 55. Pivot pin 41 is shown positioned over second guide block 43b and captures key plate 49 between switch arm 47 and pivot pin 41. Key plate 49 aligns piezoelectric switch arm 47 with pivot pin 41. Switch arm 47 is coupled to pivot pin 41 by locking screw 48. The assembled locking screw 48, switch arm 47, key plate 49, and the pivot 41 rotatably mount within a bore 51a of the bearing 51 and are secured therein by a pivot snap ring 54 and rotate relative to second guide block 43b.

Figure 13:
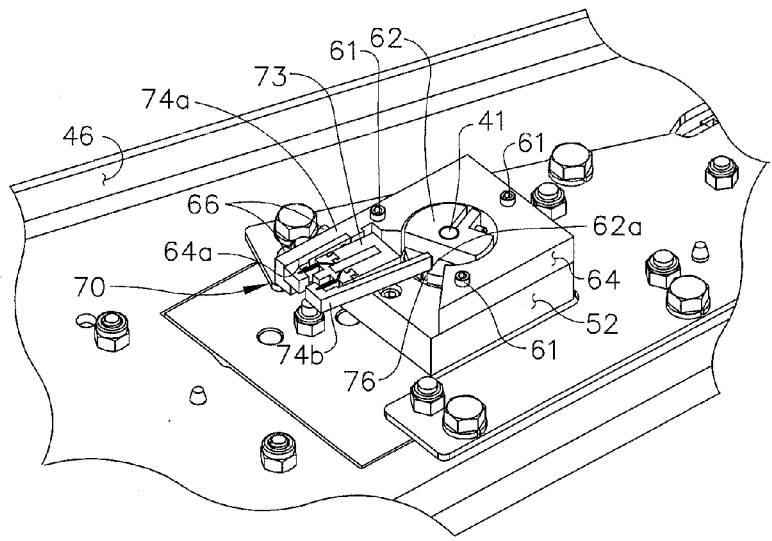
FIG. 13 is a fragmentary bottom isometric view of the switching assembly of FIG. 4 in a first position.
Figure 14:
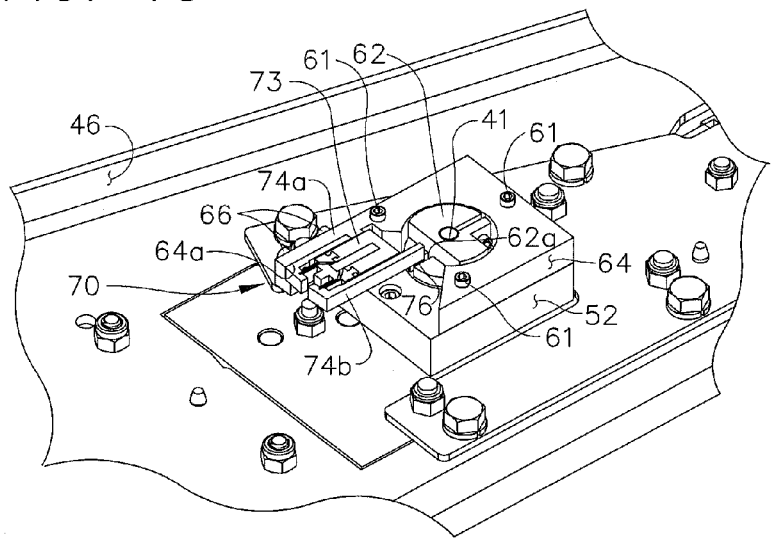
FIG. 14 is a fragmentary bottom isometric view of the switching assembly of FIG. 4 in a second position.

In FIG. 10, a piezoelectric assembly 60 is shown in an exploded view and attaches to a bottom of the bearing plate 52 with screws 61. FIGS. 13-14 show the piezoelectric assembly 60 attached to the bottom of the bearing plate 52. Referring to FIGS. 10-14, piezoelectric switch 44 includes piezoelectric assembly 60. Piezoelectric assembly 60 comprises cam 62, having cam slot 62a, which clamps onto end 41c of pivot pin 41 with clamp screw 63. Piezoelectric mount block 64 attaches to bearing plate 52 with a plurality of mount screws 61 and surrounds a portion of cam 62. Piezoelectric actuator 70 couples with inner notch 64a of piezoelectric mount block 64 with a pair of screws 66. Of course, other suitable fastening methods and/or configurations for switch assembly 40 will be apparent to one with ordinary skill in the art in view of the teachings herein.

Figure 11:
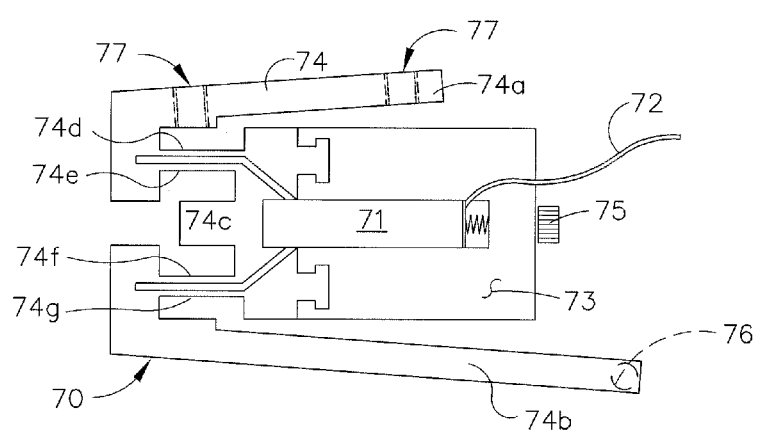
FIG. 11 is a top plan view of a piezoelectric actuator of the switching assembly of FIG. 4 in an un-actuated position.
Figure 12:
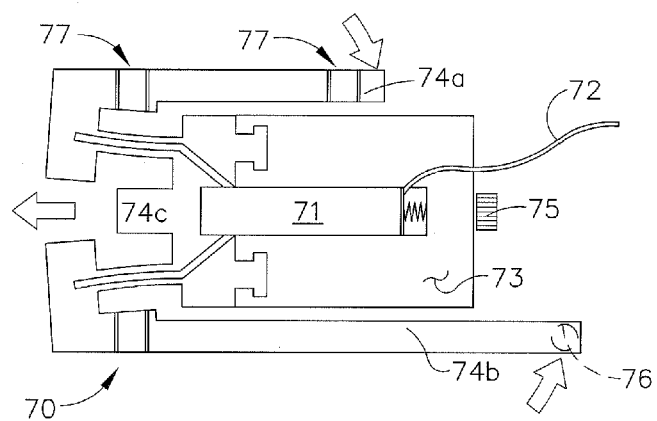
FIG. 12 is a top plan view of the piezoelectric actuator of FIG. 8 in an actuated position.

An example of a piezoelectric actuator 70 is shown in more detail in FIGS. 11 and 12 and is not limited thereto. Piezoelectric actuator 70 can be a ViVa actuator as commercially available from Parker Hannifin Corporation, 6035 Parkland Blvd., Cleveland, Ohio, 44124. Piezoelectric actuator 70 includes a piezoelectric element 71 made of piezoelectric materials. Piezoelectric materials exhibit the piezoelectric effect and release electricity when compressed, and change shape (aka mechanical strain) when subjected to an electrical charge. The piezoelectric material can be lead titanate, but other suitable piezoelectric materials will be apparent to one with ordinary skill in the art in view of the teachings herein. For example, other piezoelectric materials include crystals such as Langasite quartz or gallium orthophosphate, ceramics such as barium titanate or bismuth ferrite, and/or plastic materials such as polyvinylidine fluoride.

The physical shape change of the piezoelectric element 71 can produce a small displacement with a high output force. The piezoelectric actuator 70 can magnify the small displacement of the piezoelectric element 71 into a larger displacement that can actuate piezoelectric switch 44. Piezoelectric actuator 70 can comprise a first frame 73 that interlocks with second frame 74. Piezoelectric element 71 is held at the opposing ends thereof by first frame 73 and second frame 74. A first end of piezoelectric element 71 is compressed against second frame 74 by a pretension screw 75 that extends through first frame 73 and contacts the second end of piezoelectric element 71. Pretension screw 75 can be adjusted to remove clearances between parts and to provide a desired pre-compression to piezoelectric element 71. Wires 72 are provided to conduct electrical energy or charge to piezoelectric element 71 to induce shape change, or mechanical strain in piezoelectric element 71, thereby actuating piezoelectric actuator 70.

FIG. 11 shows piezoelectric actuator 70 in an un-actuated state with no electrical energy applied to piezoelectric element 71. FIG. 12 shows piezoelectric actuator 70 in an actuated state with electrical energy applied to piezoelectric element 71. When actuated, central tang 74c of second frame 74 moves linearly in response to the elongation of piezoelectric element 71 and causes beams 74d, 74e, 74f, 74g to flex as shown. This linear motion can be amplified with the interaction between first frame 73 and second frame 74 to produce a rotational or arcuate inward movement of both mounting frame arm 74a and output frame 74b. Due to the rectangular shape of the piezoelectric element, the actuated piezoelectric element 71 will have a greater change in length (linear) along a long axis thereof (see arrow at central tang 74c), and this greater length change will be used to provide a greater mechanical motion at some force output. This greater mechanical motion (mechanical strain) can be amplified by the shape of the ViVa actuator to produce a longer length of arcuate motion at the ends of the mounting frame arm 74a, and an output frame arm 74b. Of course, other suitable shapes for piezoelectric element 71 and the piezoelectric actuator 70 can be used. A pair of mounting holes 77 are formed in frame arm 74a to receive screws 66 to couple piezoelectric actuator 70 with piezoelectric mount block 64. Cam pin 76 extends from piezoelectric actuator 70 to engage with cam slot 62a of cam 62.

Turning now to FIG. 13, an underside view is shown of piezoelectric assembly 60 attached to bearing plate 52. Cam 62 is secured to end 41c of pivot pin 41. Piezoelectric mount block 64 is positioned to surround a portion of cam 62. Piezoelectric actuator 70 is shown in the un-actuated state and is positioned such that cam pin 76 extends into cam slot 62a of cam 62. In this position, cam 62 aligns pivot pin 41 and switch arm 47 in the direction of straight through switch guide track 42, as shown in FIG. 6. This allows guide members 34 to travel through switch guide track 42 and continue along home path 8.

If an article 100 is selected by control system 45 to be diverted, piezoelectric actuator 70 is then actuated, as shown in FIG. 14 to divert the article 100 onto branch 100 as shown in FIG. 1. Piezoelectric actuator 70 thereby moves cam pin 76 in an arcuate path within cam slot 62a to rotate cam 62. Cam 62 thereby rotates pivot pin 41 to rotate switch arm 47. Continued application of electric power to piezoelectric actuator 70 maintains piezoelectric actuator 70 in the actuated position shown in FIG. 14. With piezoelectric actuator 70 in the actuated position, pivot pin 41 aligns switch arm 47 with divert guide track 42' of guide block 43, as shown in FIG. 7. Accordingly, guide members 34 of pusher elements 30 travel through switch divert guide track 42' to divert guide track 10 of sortation conveyor 20 to divert pusher elements 30 across conveying surface 24 to branch 21. Pusher elements 30 therefore engage the selected article 100 to divert article 100, as shown in FIG. 5.

Discontinuation of power causes piezoelectric actuator 70 to return to the un-actuated state of FIGS. 11 and 13. It is believed that piezoelectric actuator 70 has a more rapid response time than motors or fluid powered devices, and can be held actuated for longer periods of time with lower power consumption. This can result in higher sortation speeds and increased article throughput. It should be noted that the actuation of piezoelectric actuator 70 could be reversed such that switch arm 47 is in the first position not extending into switch guide track 42 when piezoelectric actuator 70 is actuated, while de-actuation of piezoelectric actuator 70 places switch arm 47 in the second position diverting pusher elements 30. Other suitable configurations for switch assembly 40 will be apparent to one with ordinary skill in the art in view of the teachings herein.

The foregoing description of an embodiment has been presented for purposes of illustration and description. It is not intended to be exhaustive or to limit the invention to the precise form disclosed. Obvious modifications or variations are possible in light of the above teachings. The embodiment was chosen and described in order to best illustrate the principles of the invention and its practical application to thereby enable one of ordinary skill in the art to best utilize the invention in various embodiments and with various modifications as are suited to the particular use contemplated. Although only a limited number of embodiments are explained in detail, it is to be understood that the invention is not limited in its scope to the details of construction and arrangement of components set forth in the preceding description or illustrated in the drawings. The invention is capable of other embodiments and of being practiced or carried out in various ways. Also, in describing the embodiment, specific terminology was used for the sake of clarity. To the extent that the term "includes" is used in either the detailed description or the claims, such term is intended to be inclusive in a manner similar to the term "comprising" as "comprising" is interpreted when employed as a transitional word in a claim. It is to be understood that each specific term includes all technical equivalents which operate in a similar manner to accomplish a similar purpose. It is intended that the scope of this application will be defined by the claims submitted herewith.

What is claimed is:

1. A sortation conveyor configured to sequentially transport a plurality of articles conveyed thereon and to divert a selected article onto a branch extending therefrom, the sortation conveyor comprising:
   a first conveying surface for conveying the articles;
   a plurality of pusher elements selectively moveable laterally across the first conveying surface for diverting articles from the first conveying surface and onto a branch; and
   a piezoelectric switch positioned adjacent the branch, the piezoelectric switch configured to selectively engage with at least one of the plurality of pusher elements to divert the selected article from the first conveying surface and onto the branch.

2. The sortation conveyor of claim 1, wherein the piezoelectric switch further comprises a switch assembly including a switch guide track to guide at least one of the plurality of pusher elements along a home path and including a switch divert guide track configured to divert at least one of the plurality of pusher elements from the home path.

3. The sortation conveyor of claim 2 wherein the piezoelectric switch is configured to selectively divert the at least one of the plurality of pusher elements from the switch guide track portion of the home path and onto the switch divert guide track.

4. The sortation conveyor of claim 1, wherein the piezoelectric switch comprises a piezoelectric actuator.

5. The sortation conveyor of claim 4, wherein at least a portion of the piezoelectric actuator moves linearly.

6. The sortation conveyor of claim 4, wherein the piezoelectric actuator is actuated electrically to divert the at least one pusher element.

7. The sortation conveyor of claim 4, wherein at least a portion of the piezoelectric actuator flexes.

8. The sortation conveyor of claim 4, wherein at least a portion of the piezoelectric actuator includes a cam.

9. The sortation conveyor of claim 1, wherein the piezoelectric switch comprises:
   a switch arm moveable between a first position that guides a plurality of pusher elements along the home path and a second position at which the switch arm selectively engages with at least one of the plurality of pusher elements to divert the selected article from the first conveying surface and onto the branch; and
   a piezoelectric actuator configured to move the switch arm between the first position and the second position.

10. The sortation conveyor of claim 1, wherein the piezoelectric switch comprises
    a switch arm moveable between a first position that guides a plurality of pusher elements along the home path and a second position at which the switch arm selectively engages with at least one of the plurality of pusher elements to divert the selected article from the first conveying surface and onto the branch;
    a cam connected to the switch arm; and
    a piezoelectric actuator configured to rotate the cam so as to move the switch arm between the first position and the second position.

11. The sortation conveyor of claim 10, wherein the cam further comprises a cam slot, wherein the piezoelectric actuator is configured to engage the cam slot so as to rotate the cam when the piezoelectric actuator is actuated.

12. The sortation conveyor of claim 11, wherein the piezoelectric actuator further comprises a cam pin movable in an arcuate path to rotate the cam.

13. A method of diverting an article being conveyed on a sortation conveyor from a first conveying path to a branch, the method comprising:
    a identifying the article for diverting; and
    b actuating a piezoelectric switch to divert the article from the first conveying path to the branch.

14. The method of claim 13, wherein the piezoelectric switch comprises an arm, wherein activating the piezoelectric switch comprises rotating the arm between a first position and a second position to divert the article from the first conveying path to the second conveying path.

15. The method of claim 14, wherein the piezoelectric switch comprises a piezoelectric element, wherein rotating the arm comprises applying electrical energy to the piezoelectric element to flex the piezoelectric element.

16. The method of claim 14, wherein the piezoelectric switch comprises a piezoelectric actuator, wherein rotating the arm further comprises applying electrical energy to the piezoelectric actuator to linearly move a portion of the piezoelectric actuator.

17. The method of claim 13, wherein actuating the piezoelectric switch comprises actuating a piezoelectric actuator.

\* \* \* \* \*